US011050255B2

(12) United States Patent
Mende et al.

(10) Patent No.: US 11,050,255 B2
(45) Date of Patent: Jun. 29, 2021

(54) METHOD FOR MINIMIZING A NETWORK FEEDBACK OF A PV PARK, INVERTER, AND PV PARK

(71) Applicant: SMA Solar Technology AG, Niestetal (DE)

(72) Inventors: Denis Mende, Grossalmerode (DE); Thorsten Buelo, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 291 days.

(21) Appl. No.: 15/928,507

(22) Filed: Mar. 22, 2018

(65) Prior Publication Data

US 2018/0212429 A1 Jul. 26, 2018

Related U.S. Application Data

(63) Continuation of application No. PCT/EP2016/071152, filed on Sep. 8, 2016.

(30) Foreign Application Priority Data

Sep. 22, 2015 (DE) ...................... 10 2015 115 957.0

(51) Int. Cl.
*H02J 3/18* (2006.01)
*H02J 3/38* (2006.01)

(52) U.S. Cl.
CPC .............. *H02J 3/18* (2013.01); *H02J 3/1892* (2013.01); *H02J 3/383* (2013.01); *Y02E 10/56* (2013.01)

(58) Field of Classification Search
CPC ..... H02J 3/383; G01R 19/0084; G01R 23/02; H02M 1/32; H02M 7/44

(Continued)

(56) References Cited

U.S. PATENT DOCUMENTS 8,638,581 B2 1/2014 Zacharias
8,780,592 B1* 7/2014 Jones ...................... H02M 1/12
363/39

(Continued)

FOREIGN PATENT DOCUMENTS

DE 102011122581 A1 7/2013
DE 102013105444 A1 5/2014

(Continued)

OTHER PUBLICATIONS

International Search Report dated Nov. 24, 2016 for International Application PCT/EP2016/071152.

*Primary Examiner* — Rexford N Barnie
*Assistant Examiner* — Swarna N Chowdhuri
(74) *Attorney, Agent, or Firm* — Eschweiler & Potashnik, LLC

(57) ABSTRACT

A method and associated system for minimizing grid feedback of a PV park to an energy supply grid connected to a point of common coupling is disclosed, wherein the PV park has a plurality of inverters divided into groups. The method includes, for at least a first inverter of each group, determining a first parameter representative of a first coupling impedance between the first inverter and the point of common coupling and determining a second parameter representative of a second coupling impedance between the group containing the first inverter and the point of common coupling. The method further includes storing the first parameter and the second parameter in an operating control unit of the first inverter, and, in daytime operation of the PV park, feeding in reactive power by the first inverter depending on the first parameter, said reactive power corresponding to the magnitude of a reactive power drawn by the respective underlying first coupling impedance. The method also includes, in night-time operation, deactivating all the inverters of a group with the exception of the first inverter and (Continued)

feeding in reactive power by the first inverter depending on the second parameter, wherein the reactive power fed in corresponds to a magnitude of a reactive power drawn by the respective underlying second coupling impedance.

10 Claims, 4 Drawing Sheets

(58) Field of Classification Search
USPC .......................................................... 307/82
See application file for complete search history.

(56) References Cited

U.S. PATENT DOCUMENTS

| | | | |
|---|---|---|---|
| 9,325,173 B2 | 4/2016 | Varma | |
| 2003/0011348 A1* | 1/2003 | Lof | F03D 9/257 322/37 |
| 2012/0205981 A1 | 8/2012 | Varma | |
| 2012/0280673 A1 | 11/2012 | Watanabe | |
| 2013/0106196 A1* | 5/2013 | Johnson | H02J 3/1842 307/82 |
| 2013/0241297 A1* | 9/2013 | Falk | H02J 3/381 307/80 |
| 2013/0250635 A1* | 9/2013 | Sivakumar | H02J 3/383 363/71 |
| 2014/0046500 A1* | 2/2014 | Varma | H02J 3/386 700/298 |
| 2015/0069841 A1* | 3/2015 | Falk | H02J 3/38 307/63 |
| 2015/0115722 A1* | 4/2015 | Fawzy | H02J 3/18 307/82 |
| 2015/0148974 A1 | 5/2015 | Diedrichs | |

FOREIGN PATENT DOCUMENTS

| | | |
|---|---|---|
| EP | 1906505 A1 | 4/2008 |
| JP | 2003153444 A | 5/2003 |
| JP | 2013183622 A | 9/2013 |

* cited by examiner

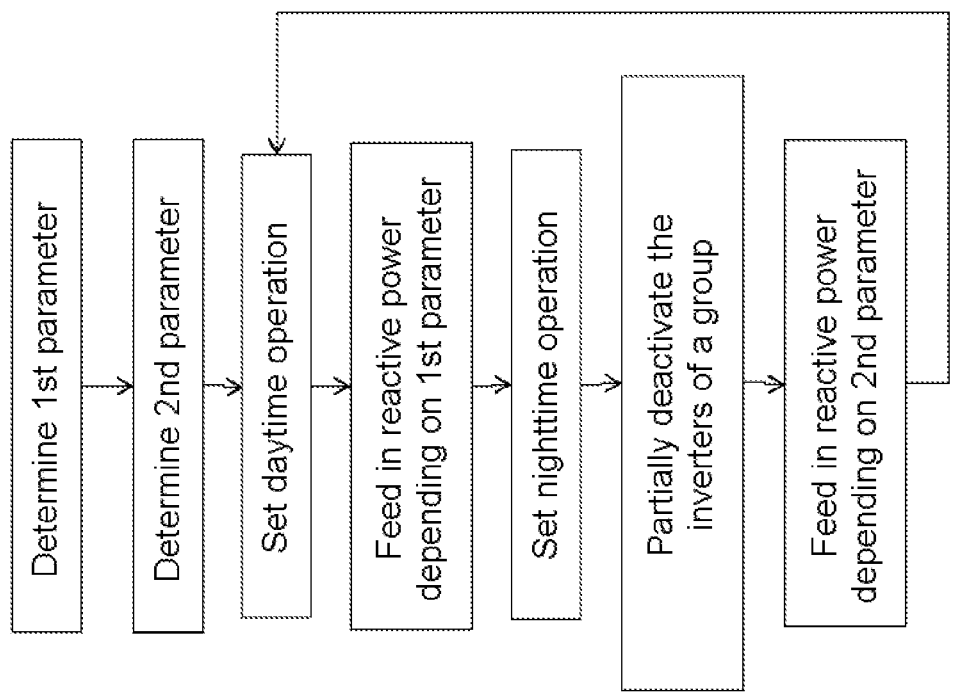

METHOD FOR MINIMIZING A NETWORK FEEDBACK OF A PV PARK, INVERTER, AND PV PARK

CROSS REFERENCE TO RELATED APPLICATIONS

This application claims priority to International Patent Application number PCT/EP2016/071152, filed on Sep. 8, 2016, which claims priority to German Patent Application number 10 2015 115 957.0, filed on Sep. 22, 2015, and is hereby incorporated by reference in its entirety.

FIELD

The disclosure relates to a method for minimizing grid feedback of a PV park, and to an inverter and respectively to a photovoltaic (PV) park, which are configured to carry out the method.

BACKGROUND

The supply of electrical energy from a distribution grid is increasingly being ensured by renewable energies, for example by photovoltaics. One characteristic of such renewable energy generation plants is that, in contrast to conventional power plants, they are integrated into the grid not centrally but at a multiplicity of locations. This integration of a high number of in-feeding plants requires considerations regarding the grid feedback of such an in-feed in order to further be able to provide a sufficient grid quality. As a result, additional demands arise for the decentralized feeders in order that they make a sufficient contribution to ensuring the grid quality. For example, providing reactive power is required, which can comprise a fixed or a variable characteristic-curve-dependent value. Another approach is that the decentralized feeders provide, in addition to the active power fed in, a proportion of reactive power such that the influence of the in-feed on grid parameters like the voltage is minimized at the point of common coupling of said feeders. In this case, this is referred to as a grid-feedback-free energy generation plant. In this case, known inverters are capable of forming their in-feed parameters in such a way that predetermined voltage relations can be satisfied at the point of common coupling of the PV park, even when the corresponding inverter is connected at a distance from said point of common coupling.

Since no active power can be provided by the PV park during the night but the PV park can nevertheless exhibit not inconsiderable grid feedback through the exchange of reactive power, in the prior art, the PV park is disconnected from the energy supply grid during this time or additional reactive power sources are provided in the PV park, which compensate for the exchanged reactive power.

SUMMARY

In light of this consideration, the present disclosure is directed to decentralized feeders, in particular PV parks having a multiplicity of inverters, with little outlay in terms of apparatus such that the grid feedback of said feeders is minimized both in daytime operation and in nighttime operation, that is to say, in particular, also in such a way that the PV park does not have to be disconnected during the night, in order to eliminate influencing of the grid quality.

The method according to the disclosure serves to minimize grid feedback of a PV park to an energy supply grid connected to a point of common coupling. The PV park comprises a multiplicity of inverters divided into groups. In the context of the method, for at least one first inverter of each group, a first parameter representative of a first coupling impedance between the inverter and the point of common coupling and a second parameter representative of a second coupling impedance between the group containing the inverter and the point of common coupling is determined. Said parameters are then stored in an operating control unit of the respective inverter. In daytime operation of the PV park, the first inverter feeds in reactive power depending on the first parameter, said reactive power corresponding to the magnitude of a reactive power drawn by the underlying first coupling impedance. This results in a situation in which the reactive power fed in by the first inverter does not lead to reactive power exchange with the energy supply grid. As a result, the PV park can be set in daytime operation in such a way that said PV park does not exchange reactive power with the energy supply grid as an entire PV park either. Alternatively, in daytime operation, a prescribed target value of reactive power that is exchanged with the energy supply grid can also be sought. In this case, the first inverter feeds in reactive power depending on the first parameter, said reactive power corresponding to the magnitude of the reactive power drawn by the underlying first coupling impedance plus the target value.

In nighttime operation, all the inverters of a group with the exception of the first inverter are deactivated, and reactive power is fed in by the precisely one inverter depending on the second parameter, said reactive power corresponding to the magnitude of a reactive power drawn by the respective underlying second coupling impedance. Therefore, in nighttime operation as well, the undesired reactive power exchange with the energy supply grid via the point of common coupling being caused by the inverter group can be minimized or completely prevented. As a result, the grid feedback of the PV park is minimized both in daytime operation and in nighttime operation. As a result, isolating the deactivated inverter from the grid is superfluous and a corresponding isolating apparatus can be saved or be designed for fewer switching processes and therefore in a more cost-effective manner.

In one preferred embodiment of the disclosure, exclusively the first inverter in each group is configured to feed in reactive power in nighttime operation. However, it is likewise conceivable that, within a group, a plurality of inverters are configured to feed in reactive power in nighttime operation. The task of feeding in reactive power in nighttime operation can then be passed on between the multiple inverters, for example from night to night or at a different frequency of alternation. In this way, the individual loading of the inverters can be reduced and the lifetime thereof can be increased accordingly. The alternation between the inverters configured to feed in reactive power can be effected in a controlled manner, for example, based on a prescribed algorithm or by an operating control unit, which can be realized as an independent component of the PV park or as part of an inverter. However, the multiple inverters can also be used at the same time for feeding in reactive power in nighttime operation when the required reactive power exceeds the reactive power capacity of an individual inverter.

In a further embodiment of the method according to the disclosure, the reactive power fed in is determined as a function of the insolation on PV generators connected to the inverters, or the active power resulting therefrom. In this way, a reactive power component associated with the first coupling impedance between the inverter and the point of common coupling can be balanced in a targeted manner. The accuracy of this targeted compensation increases when it is assumed that all of the other PV generators connected to inverters of the PV park have the same insolation, which should generally be the case in a correctly designed PV park. In this case, PV parks having complexly distributed grid impedances within the park having suitable, simple values for the first coupling impedance can also completely or virtually completely prevent a flow of reactive power via the point of common coupling of the PV park.

BRIEF DESCRIPTION OF THE DRAWINGS

In the following text, the disclosure is illustrated using figures, in which

FIG. 4 shows a flow chart of the method according to the disclosure.

DETAILED DESCRIPTION

Figure 1:
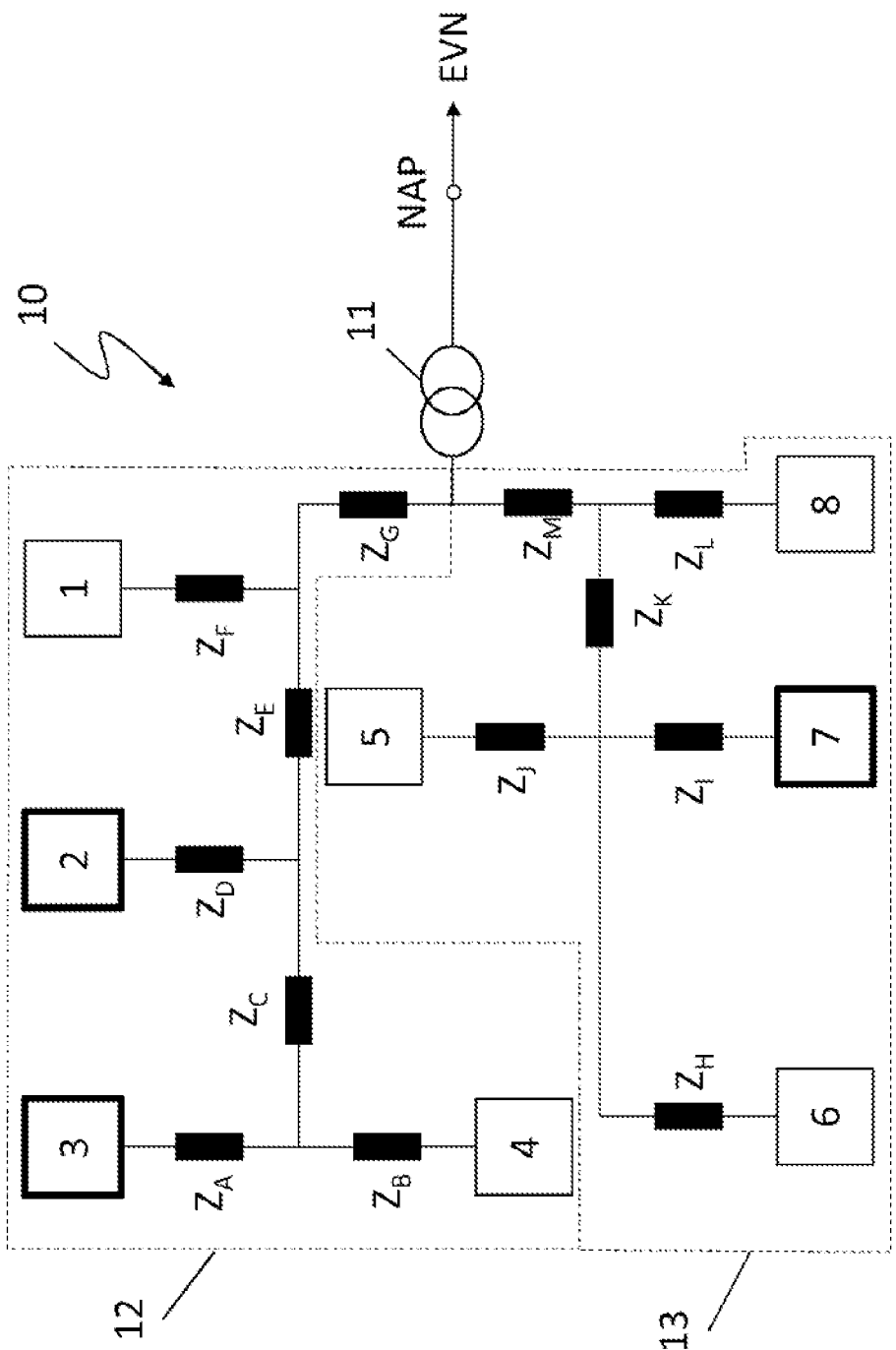
FIG. 1 shows a schematic illustration of an example structure of a PV park.
Figure 2:
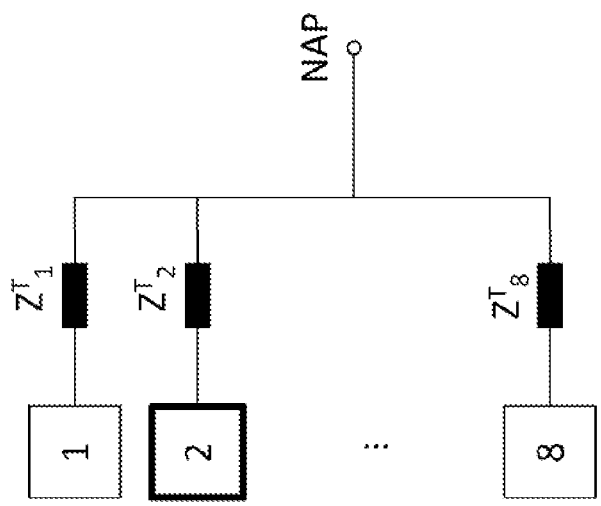
FIG. 2 shows an equivalent circuit diagram of the PV park for the inventive determination of parameters in daytime operation.
Figure 2:
Figure 3:
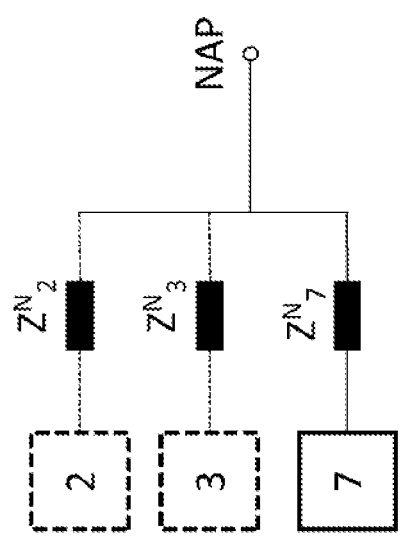
FIG. 3 shows an equivalent circuit diagram of the PV park for the inventive determination of parameters in nighttime operation.
Figure 3:

FIG. 1 shows a schematic view of a PV park 10 comprising a multiplicity of inverters 1 to 8. The inverters convert the direct current generated by PV generators (not shown as separate elements for the sake of clarity) connected to said inverters to alternating current and are connected by means of a park-internal grid to a point of common coupling NAP via a transformer 11, said point of common coupling forming the common connecting point of the park to an energy supply grid EVN. The impedances of the park-internal grid are illustrated as grid impedances $Z_A, \ldots Z_M$ of the individual grid sections. Only some of the inverters, in this case the inverters 2, 3 and 7, for example, are configured to provide reactive power during the night, that is to say when the PV generators generate no power or negligible power. This is symbolized by the sharper outline of the inverters in FIG. 1. The PV park is divided into a first group 12 and a second group 13 of inverters, wherein each group comprises at least one inverter configured to provide reactive power at night. The transformer 11 representing a further grid impedance of the park-internal grid to be taken into account, is optional here. In place of said transformer, the park-internal grid can also be connected directly to the EVN by means of the point of common coupling. The grid impedances $Z_A, \ldots Z_M$ of the individual grid sections can be derived from the knowledge of resistances, capacitances and inductances of the installed components, or else by way of measuring in a manner known to those skilled in the art. In particular, the reactance components of the grid impedances can be detected separately according to capacitive and inductive reactance. The distribution of the park-internal impedances can be approximated by a simplified equivalent circuit diagram of the PV park. The daytime operation of the PV park is shown in FIG. 2, the night-time operation in FIG. 3.

During the day, when all of the inverters feed in the energy generated by the PV generators of said inverters, each inverter n is directly connected in the equivalent circuit diagram to the point of common coupling NAP by means of an equivalent daytime impedance $Z^T_n$ associated with said inverter. The values of the equivalent daytime impedances $Z^T_n$ are in this case determined by known mathematical processes such that, in all conceivable operating conditions of the PV park, the flow of reactive power via the point of common coupling describes the flow of reactive power of the real PV park with its more complex distribution of grid impedances as accurately as possible by way of the equivalent circuit diagram. In one variant of said method, the reactive powers drawn in the grid impedances $Z_A, \ldots Z_M$ of the individual grid sections in given operating conditions are analyzed in the individual inverters as components associated with initiators. The equivalent daytime impedances $Z^T_n$ are then selected in such a way that the reactive powers drawn in said equivalent daytime impedances in the same operating conditions correspond to the sum of all of the components associated with the corresponding inverter n as the initiator. In this case, the equivalent daytime impedance $Z^T_n$ can also be separated into a capacitive and inductive reactance component and these values can be stored and used separately in the inverter.

These specific equivalent daytime impedances $Z^T_n$ describe the PV park in its current developed state and can be used for at least as long as the park remains unchanged in terms of its internal structure. In one advantageous embodiment, the equivalent daytime impedances $Z^T_n$ are determined assuming that the insolation on all the PV generators of the PV park is identical. In this case, operating conditions comprise the reactive power and active power values of the individual inverters, and the grid voltage at the point of common coupling. Each inverter of the PV park is configured to store the equivalent value of the daytime impedance $Z^T_n$ associated with said inverter and can use said value to control its in-feed parameters, in particular to fix its present reactive power.

During the night, only the inverters configured to provide nighttime reactive power, but at least one such inverter from each group, are connected to the grid. Consequently, the equivalent circuit diagram for the PV park is restricted to the inverters still connected to the grid, the inverter 7 of the second group 13 and the inverter 2 and/or the inverter 3 of the first group 12. Said inverters are connected directly to the point of common coupling by means of the equivalent nighttime impedances $Z^N_{2, 3, 7}$ associated with said inverters. Analogously to the case of operating in the day, the equivalent nighttime impedances $Z^N_{2, 3, 7}$ are in this case determined by the mathematical processes already referred to above such that, in all conceivable operating conditions of the PV park, the flow of reactive power via the point of common coupling describes the flow of reactive power of the real PV park with its more complex distribution of grid impedances as accurately as possible by way of the equivalent circuit diagram. In one variant of said method, the reactive powers drawn in the grid impedances $Z_A, \ldots Z_M$ of the individual grid sections in given operating conditions during the night are analyzed in the individual groups as components associated with initiators. The equivalent nighttime impedances $Z^N_n$ are then selected in such a way that the reactive powers drawn in said impedances correspond to the sum of all of the components associated with the group comprising the first inverter as initiator. The nighttime impedances generally differ therefore from the daytime impedances, since at night some of the inverters are deactivated, wherein the grid impedances $Z_A, \ldots Z_M$ of the grid sections thereof remain part of the park-internal grid and are taken into account only by the equivalent nighttime impedances of the inverters that are active at night. In this case, the equivalent nighttime impedance $Z^N_n$ can also be separated into a capacitive and inductive reactance component and these values can be stored and used separately in the inverter.

Each of the inverters configured to provide nighttime reactive power is also configured to store the equivalent value of the nighttime impedance $Z^N_n$ associated with said inverter and can use said value to control its present reactive power during nighttime operation.

In the above description, it is a special case of setting the control of the inverters in daytime operation and/or in nighttime operation in such a way that the flow of reactive power via the point of common coupling is minimal, ideally equal to zero, such that feedback of the PV park to the energy supply grid is minimized. This aim can be achieved at least in a good supply by virtue of each inverter, which feeds into the park-internal grid, contributing as much reactive power as is withdrawn from the grid in the equivalent grid impedance $Z^T_n$, $Z^N_n$ associated with said inverter. The inverter can easily determine said target value of the reactive power itself given knowledge of the corresponding values of the grid impedance and the voltage at the connection terminals of said inverter.

In one exemplary embodiment, the common aim of the inverters within the PV park can be adjusted to provide a target value of the total reactive power of the PV park at the point of common coupling such that the PV park can make an active contribution to maintaining the grid quality. The target value can be a discrete value prescribed, for example, by the operator of the EVN and made known to the PV park or to the individual inverters by means of suitable communication channels, or a variable dependent on the present state of the EVN, in particular a reactive power value $Q(U_{NAP})$ dependent on the grid voltage $U_{NAP}$ at the point of common coupling. In order to realize this common aim, each inverter has to contribute a reactive power value that exceeds the value of the reactive power drawn by the equivalent grid impedances $Z^T_n$, $Z^N_n$ associated with said inverter by a fraction of the total reactive power target value $Q(U_{NAP})$ associated with said inverter. In this case, the inverter can additionally take into account a voltage drop between the voltage at the point of common coupling and the voltage at the connection terminals of the inverter, that is to say a voltage drop across the equivalent grid impedances $Z^T_n$, $Z^N_n$ in order to determine the required reactive power $Q(U_{NAP})$ based on the grid voltage at the connection terminals of said inverter.

If a plurality of inverters of a group are configured to provide reactive power in nighttime operation, in one embodiment of the disclosure, the role of the inverter that is active at night can be swapped between said inverters. For example, it is conceivable that, each night, a different inverter provides the reactive power in nighttime operation. In this case, the role can be alternated according to a predefined schema or can be coordinated by means of a superordinate operating control unit of the PV park. Coordination of the suitable inverters with respect to one another by means of a communication channel between said inverters is likewise conceivable. The loading of the components of the inverters involved and hence the maintenance costs of the PV park are reduced thereby.

Particularly in nighttime operation, the situation can arise in which, at an observed time, the required reactive power of an active inverter is higher than the maximum reactive power that can be generated by the inverter. If the corresponding group comprises at least one further inverter, said groups being configured to provide reactive power, it is conceivable for said inverter to be additionally activated by the active inverter or by a superordinate control unit of the PV park such that the reactive power to be generated is generated by said two inverters together. In the case of the joint provision of the reactive power by the two (or more) inverters, the inverters involved are, in one embodiment, coordinated with one another by means of communication protocols, in particular because the grid impedance to be taken into account is then distributed over the inverters involved. If the required reactive power should then permanently decrease again over the course of the night to such an extent that it can be provided by a single inverter, the additionally activated inverter can be deactivated again. In principle, it is of course also possible in this case to also temporarily activate an inverter of another group.

FIG. 4 illustrates an embodiment of a method according to the disclosure as a flow chart. In a first act 40, for at least one first inverter of each group of a PV park, a first parameter representative of a coupling impedance between the first inverter and the point of common coupling is determined, for example the equivalent daytime impedance $Z^T_1$ described above. The first parameter is stored in an operating control unit of the first inverter.

In a second act 41, for the first inverter of each group, a second parameter representative of a second coupling impedance between the group containing the first inverter and the point of common coupling is also determined, for example the equivalent nighttime impedance $Z^N_1$ described above. The second parameter is also stored in the operating control unit of the first inverter. The first act 40 and the second act 41 are intended to be carried out before the first start-up procedure of the PV park, then they can be carried out again regularly in order to update the values of the first and second parameter.

In the context of daytime operation of the PV park initiated by a third act 42, in a fourth act 43, the first inverter feeds in reactive power depending on the first parameter. The first inverter determines said reactive power using the first parameter in such a way that the reactive power corresponds to the magnitude of the reactive power drawn by the underlying equivalent daytime impedance $Z^T_1$. This kind of in-feed of reactive power can also be carried out in parallel in the same way by the other inverters that are active during daytime operation.

After the PV park has changed over to nighttime operation in a fifth act 44, the inverters that are intended to provide no reactive power during the night are deactivated in a sixth act 45. In the present example, only the first inverter therefore remains as the only inverter of the group associated with said inverter in an active state. In a seventh act 46, said inverter feeds in reactive power depending on the second parameter such that the reactive power fed in corresponds to the magnitude of the reactive power drawn by the underlying equivalent nighttime impedance $Z^N_1$.

In this embodiment of the disclosure, all the inverters accordingly feed in only the proportion of reactive power drawn in the equivalent coupling impedances $Z^T_n$, $Z^N_n$ associated with said inverters. This results in a situation in which no or at least a negligible flow of reactive power is achieved at the point of common coupling, since the reactive power fed in at least approximately corresponds to the reactive power drawn within the PV park. This aim is achieved without requiring an active measurement of the flow of reactive power at the point of common coupling, and without requiring communication of measured values to the first inverter. The reactive power of the PV park is inherently minimized thereby and therefore has virtually no feedback on the connected energy supply grid, without requiring additional components for the active balancing of flows of reactive power.

In a further embodiment of the disclosure in which an operating aim of the PV park does not consist in minimizing the flow of reactive power at the point of common coupling but in reaching a prescribed reactive power target value, a reactive power component is additionally fed in by the active inverters, in particular by the first inverter, said reactive power component corresponding to a fraction of the reactive power target value associated with the first inverter. In this case, too, the operating aim of the PV park is achieved without the use of additional components for the active balancing of flows of reactive power.

After the end of nighttime operation, the inverter can be transferred to daytime operation again by means of act 42.

The invention claimed is:

1. A method for minimizing grid feedback of a PV park to an energy supply grid connected to a point of common coupling, wherein the PV park has a plurality of inverters divided into groups, comprising:
   for at least a first inverter of each group, determining a first parameter representative of a first coupling impedance between the first inverter and the point of common coupling and determining a second parameter representative of a second coupling impedance between the group containing the first inverter and the point of common coupling,
   storing the first parameter and the second parameter,
   in daytime operation of the PV park, feeding in a first reactive power by the first inverter depending on the first parameter, said first reactive power corresponding to a magnitude of a reactive power drawn by the first coupling impedance, and
   in nighttime operation, deactivating all the inverters of a group with the exception of the first inverter and feeding in a second reactive power by the first inverter depending on the second parameter, wherein the second reactive power fed in corresponds to a magnitude of a reactive power drawn by the second coupling impedance.

2. The method as claimed in claim 1, wherein, within a group, exclusively the first inverter is configured to feed in the second reactive power in nighttime operation.

3. The method as claimed in claim 1, wherein, within a group, more than one inverter is configured to feed in the second reactive power in nighttime operation and wherein the in-feed of the second reactive power during nighttime operation alternates between the inverters configured to feed in the second reactive power.

4. The method as claimed in claim 3, wherein the alternation between the inverters configured to feed in the second reactive power is controlled based on a prescribed algorithm.

5. The method as claimed in claim 1, wherein the first reactive power is determined as a function of an insolation on PV generators connected to the inverters.

6. The method as claimed in claim 5, wherein the first reactive power is determined assuming that the PV generators connected to all the other inverters of the PV park have a same insolation.

7. The method as claimed in claim 1, wherein, in the determination of the first and second reactive powers, the inverters also take into account a reactive power target of an operator of the energy supply grid for the PV park at the point of common coupling thereof.

8. The method as claimed in claim 1, wherein the first and second reactive powers are determined as a function of a grid voltage at connection terminals of the respective inverter.

9. An inverter, configured to store a first parameter and a second parameter and to perform daytime operation and nighttime operation of a method for minimizing grid feedback of a PV park to an energy supply grid connected to a point of common coupling, wherein the PV park has a plurality of inverters divided into groups, the method for minimizing grid feedback comprising:
   for at least a first inverter of each group, determining the first parameter representative of a first coupling impedance between the first inverter and the point of common coupling and determining the second parameter representative of a second coupling impedance between the group containing the first inverter and the point of common coupling,
   storing the first parameter and the second parameter,
   in daytime operation of the PV park, feeding in a first reactive power by the inverter depending on the first parameter, said first reactive power corresponding to a magnitude of a reactive power drawn by the first coupling impedance, and
   in night-time operation, deactivating all other inverters of a group with the exception of the inverter and feeding in a second reactive power by the inverter depending on the second parameter, wherein the second reactive power fed in corresponds to a magnitude of a reactive power drawn by the second coupling impedance.

10. A PV park exhibiting a minimized grid feedback to an energy supply grid connected thereto via a point of common coupling, wherein the PV park has a plurality of inverters divided into groups, and wherein the PV park is configured to carry out a method for minimizing grid feedback of a PV park to the energy supply grid, comprising:
   for at least a first inverter of each group, determining a first parameter representative of a first coupling impedance between the first inverter and the point of common coupling and determining a second parameter representative of a second coupling impedance between the group containing the first inverter and the point of common coupling,
   storing the first parameter and the second parameter,
   in daytime operation of the PV park, feeding in a first reactive power by the first inverter depending on the first parameter, said first reactive power corresponding to a magnitude of a reactive power drawn by the first coupling impedance, and
   in night-time operation, deactivating all the inverters of a group with the exception of the first inverter and feeding in a second reactive power by the first inverter depending on the second parameter, wherein the second reactive power fed in corresponds to a magnitude of a reactive power drawn by the second coupling impedance.

* * * * *